(12) United States Patent
Jagodits et al.

(10) Patent No.: US 11,855,747 B2
(45) Date of Patent: Dec. 26, 2023

(54) SYSTEMS AND METHODS FOR TRANSMITTING DATA VIA A SATELLITE NETWORK

(71) Applicant: Hughes Network Systems, LLC, Germantown, MD (US)

(72) Inventors: Thomas Jagodits, Poolesville, MD (US); Sandeep Ahluwalia, Gaithersburg, MD (US); Charles A Barnett, Leesburg, VA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 92 days.

(21) Appl. No.: 17/122,097

(22) Filed: Dec. 15, 2020

(65) Prior Publication Data

US 2022/0190912 A1    Jun. 16, 2022

(51) Int. Cl.
*H04B 7/185* (2006.01)

(52) U.S. Cl.
CPC ..... *H04B 7/18558* (2013.01); *H04B 7/18506* (2013.01); *H04B 7/18523* (2013.01); *H04B 7/18582* (2013.01)

(58) Field of Classification Search
None
See application file for complete search history.

(56) References Cited

U.S. PATENT DOCUMENTS

| | | | | |
|---|---|---|---|---|
| 6,985,454 B1* | 1/2006 | Wiedeman | ......... | H04B 7/18589 370/316 |
| 7,376,122 B2* | 5/2008 | Draves, Jr. | ............ | H04L 45/123 370/469 |
| 7,385,960 B2* | 6/2008 | Bansal | .................. | H04L 47/822 370/332 |
| 9,641,616 B2* | 5/2017 | Law | .................... | H04L 67/1097 |
| 2003/0099212 A1* | 5/2003 | Anjum | .................. | H04W 92/02 370/328 |
| 2004/0199662 A1* | 10/2004 | Karol | .................. | H04L 63/0227 709/227 |
| 2018/0083737 A1* | 3/2018 | Mendes da Silva | ...... | H04L 1/22 |

* cited by examiner

*Primary Examiner* — Willie J Daniel, Jr.
(74) *Attorney, Agent, or Firm* — GLOBAL IP COUNSELORS, LLP

(57) ABSTRACT

Systems and methods for transmitting data using a satellite communication network are disclosed herein. In an embodiment, a satellite communication network includes a first terminal, a second terminal, and a base station. The first terminal is configured to collect first target data. The second terminal is configured to receive a first data packet including the first target data from the first terminal via a local connection. The base station is in communication with the first terminal and the second terminal via at least one satellite. The base station is configured to: (i) receive copies of the first data packet from each of the first and second terminals via the at least one satellite; (ii) process a first copy of the first data packet; and (iii) delete a second copy of the first data packet.

20 Claims, 8 Drawing Sheets

SYSTEMS AND METHODS FOR TRANSMITTING DATA VIA A SATELLITE NETWORK

BACKGROUND

Field of the Invention

The present disclosure generally relates to systems and methods for transmitting data from a plurality of terminals to a base station using a satellite network. In particular, the present disclosure relates to systems and methods which locally transmit data between terminals to avoid satellite blockages and expedite transmission of the data to the base station.

Background Information

Satellite networks, such as Low-Earth Orbit (LEO) satellite networks, generally provide reliable transmission of data from a terminal to a base station using one or more satellite. However, such satellite networks typically require a direct line of sight between the terminals and the satellites. Various natural and unnatural obstacles can disrupt a terminal's line of sight with a satellite, preventing the data from reaching the base station until the satellite moves to a different position. The transmission of data to the base station from the terminal can therefore be unnecessarily or unexpectedly delayed, or even lost altogether.

SUMMARY

Some satellite networks can include terminals which are placed in locations that are not ideal for satellite transmissions, for example, due to an obstacle which blocks a direct line of sight between a terminal and the path of a satellite. The present disclosure provides improved systems and methods that enable terminals to bypass potential obstacles to obtain direct lines of sight with a satellite. More specifically, the present disclosure provides improved systems and methods that enable a blocked terminal to directly communicate with other terminals in a local group to expedite the transmission of data to the satellite.

In view of the state of the known technology, one aspect of the present disclosure is to provide a method for transmitting data using a satellite communication network. The method includes establishing a local connection between a first terminal and a second terminal, the first terminal and the second terminal each configured to separately communicate with a base station via at least one satellite, transmitting a first data packet from the first terminal to the second terminal via the local connection, transmitting a first copy of the first data packet from the second terminal to the base station via the at least one satellite, transmitting a second copy of the first data packet from the first terminal to the base station via the at least one satellite, processing, at the base station, one of the first copy of the first data packet received from the second terminal and the second copy of the first data packet received from the first terminal, and deleting, at the base station, the other of the first copy of the first data packet received from the second terminal and the second copy of the first data packet received from the first terminal.

Another aspect of the present disclosure is to provide another method for transmitting data using a satellite communication network. The method includes establishing a local connection between a first terminal and a second terminal, the first terminal and the second terminal each configured to separately communicate with a base station via at least one satellite, transmitting a first data packet from the first terminal to the second terminal via the local connection, the first data packet including an expected transmission time that the first terminal intends to transmit the first data packet to the base station via the at least one satellite, when a next transmission opportunity for the second terminal to transmit data via the at least one satellite is earlier than the expected transmission time, transmitting the first data packet from the second terminal to the base station via the at least one satellite, and when the next transmission opportunity for the second terminal to transmit data via the at least one satellite is later than the expected transmission time, deleting the first data packet at the second terminal.

Another aspect of the present disclosure is to provide a satellite communication network. The satellite communication network includes a first terminal, a second terminal, and a base station. The first terminal is configured to collect first target data. The second terminal is configured to receive a first data packet including the first target data from the first terminal via a local connection. The base station is in communication with the first terminal and the second terminal via at least one satellite. The base station is configured to: (i) receive copies of the first data packet from each of the first terminal and the second terminal via the at least one satellite; (ii) process a first copy of the first data packet received from one of the first terminal and the second terminal; and (iii) delete a second copy of the first data packet received from the other of the first terminal and the second terminal.

Also, other objects, features, aspects and advantages of the disclosed satellite communication systems and methods will become apparent to those skilled in the art in the field of satellite communication from the following detailed description, which, taken in conjunction with the annexed drawings, discloses preferred embodiments of satellite communication systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
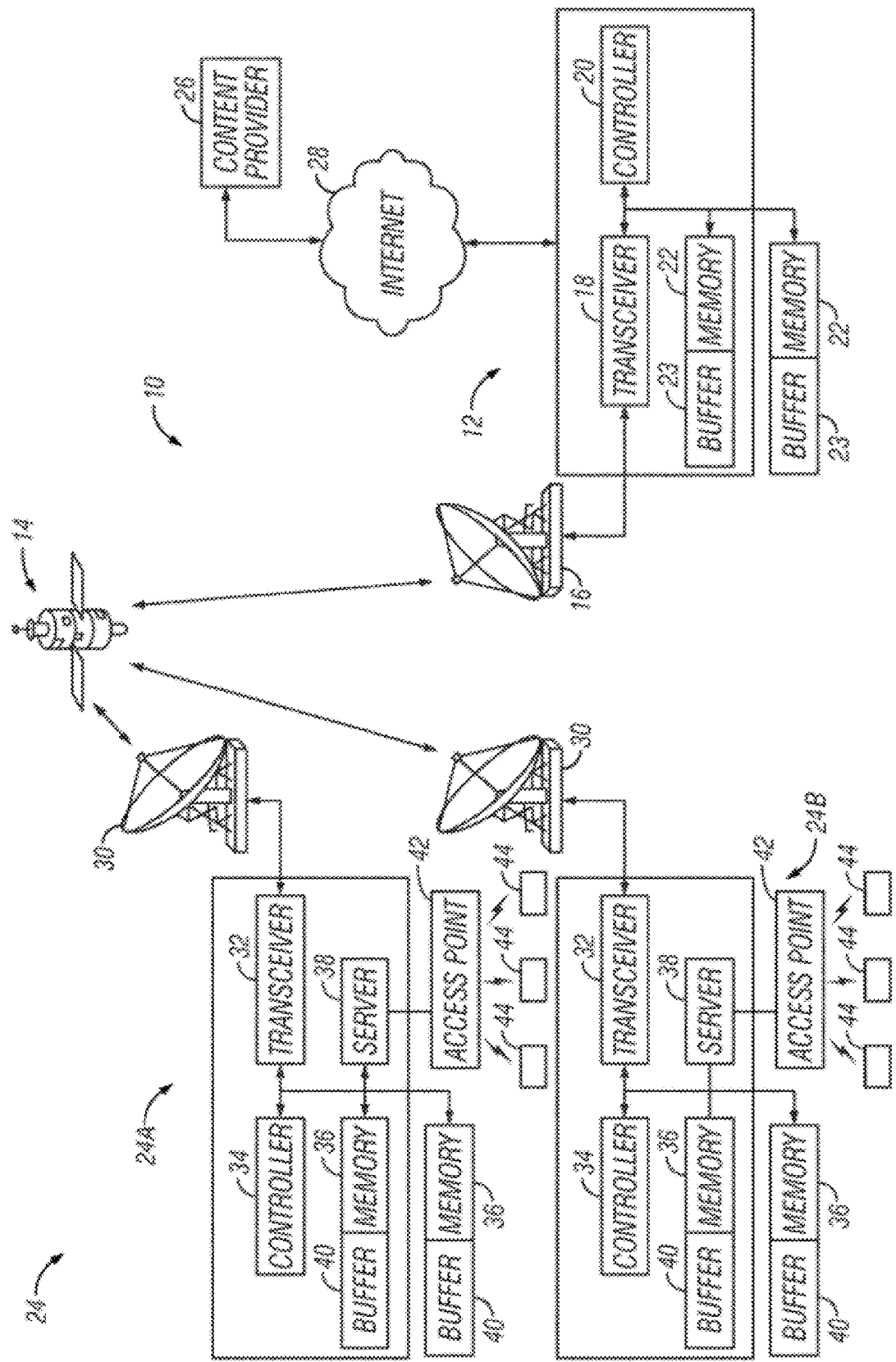
FIG. 1 illustrates an example embodiment of a satellite communication network according to the present disclosure.

FIG. 1 illustrates an example embodiment of a satellite communication network 10 in accordance with the present disclosure. A satellite communication network 10 typically includes a terrestrial gateway or base station 12 (hereinafter "base station 12") that communicates with one or more orbiting satellites 14. The system can include a plurality of base stations 12. A base station is configured to process data received via one or more orbiting satellites 14. Each base station 12 can include an antenna dish 16, a transceiver 18, a controller 20, a memory 22 and other types of equipment (not shown) such as amplifiers, waveguides and so on as understood in the art which enable communication between the base station 12 and a plurality of terminals 24 via one or more of the orbiting satellites 14. The memory 22 can be, for example, an internal memory in the base station 12, or other type of memory devices such as flash memory or hard drives with an external high speed interface such as a USB bus or an SATA bus, or remote memories such as cloud storage and so on. These other types of memory can be present at the base station 12 or accessible at a location apart from the base station 12 via a network connection such as an Ethernet connection, a WiFi connection or any other suitable type of connection as understood in the art. Also, the memory 22 can include at least one buffer 23 which is configured to buffer, for example, packets to be sent by the base station 12.

As understood in the art, the controller 20 preferably includes a microcomputer with a control program that controls the base station 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the base station 12 as appropriate, in a conventional manner. It will be apparent to those skilled in the art from this disclosure that the precise structure and algorithms for the controller 20 can be any combination of hardware and software that will carry out the functions of the present disclosure.

The base station 12, the satellite 14 and the terminals 24 typically communicate with each other over a radio frequency link, such as a Ku-band link, a Ka-band link or any other suitable type of link as understood in the art, which can generally be referred to as a space link. In an embodiment, the base station 12 can include or be configured as an inroute group manager, which can be configured to control the bandwidth allocations to the terminals 24 (e.g., on an inroute or inroute group basis), and to correspondingly control and administer the bandwidth allocation approaches. Also, one or more base station 12 can include or be configured as a network management system, which, among other things, operates to communicate with remote sites, such as web content providers 26, via the Internet 28, cloud storage, or other communication networks as understood in the art. In addition, the base stations 12 can communicate with each other via, for example, the Internet 28 or other communication networks.

The satellite communication network 10 includes a plurality of terminals 24. In FIG. 1, the plurality of terminals 24 includes a first terminal 24A and a second terminal 24B. Each of the first terminal 24A and the second terminal 24B can be configured as discussed herein with respect to a terminal 24. Although only two terminals 24 are shown in FIG. 1, it should be understood from this disclosure that the two terminals 24 are shown for simplicity and that the methods discussed herein can and typically will be performed with more than two terminals 24.

As shown in FIG. 1, a terminal 24 typically includes an antenna dish 30, a transceiver 32, a controller 34, a memory 36, a local server 38 and other types of equipment (not shown) such as amplifiers, waveguides and so on as understood in the art which enable communication between the terminal 24 and one or more base stations 12 via one or more of the orbiting satellites 14. As explained in more detail below, an antenna dish 30 utilized by a terminal 24 can require a direct line of sight with a satellite 14 to transmit data to the satellite 14. A transceiver 32 can include, for example, an integrated satellite modem and any other suitable equipment which enables the transceiver 32 to communicate with one or more of the orbiting satellites 14 as understood in the art. The memory 36 can be, for example, an internal memory in the terminal 24, or other type of memory devices such as a flash memory or hard drives with an external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Moreover, the memory 36 can include at least one buffer 40 which is configured to buffer, for example, received data packets included in communication signals transmitted from the base station 12.

As explained in more detail below, the local server 38 is configured to enable local communication between terminals 24. For example, the local server 38 of the first terminal 24A can include a transceiver which communicates with another transceiver of the local server 38 of the second terminal 24B. In this way, the first terminal 24A and the second terminal 24B are configured to directly communicate with each other via a local connection. The first terminal 24A and the second terminal 24B can communicate using wireless technology, for example, a low-power wide-area network (LPWAN), low power embedded (LPE) WiFi. Zigbee. and/or any other suitable Wireless communication protocol. Alternatively, the first terminal 24A and the second terminal 24B can communicate using wired technology.

The local server 38 can also include or communicate with an access point 42, such as a wireless application protocol (WAP) or any other suitable device, which enables the local server 38 to collect data from data supplying devices 44. Such data supplying devices 44 can include user devices such as desktop computers, laptop or notebook computers, tablets (e.g., iPads), smart phones, smart TVs and any other suitable devices as understood in the art. Thus, in an embodiment, the local server 38 is configured to collect user data from user devices for eventual transmission to the base station 12 via the satellite 14. Such data supplying devices 44 can also include detection devices such as sensors which are arranged to collect sensor data for eventual transmission to the base station 12 via the satellite 14. Thus, in an embodiment, the local server 38 is configured to collect sensor data from detection devices for eventual transmission to the base station 12 via the satellite 14. Naturally, the communications between the local server 38, the access point 42 and the data supplying devices 44 can occur over wireless connections, such as WiFi connections, as well as wired connections as understood in the art.

As with the controller 20 for a base station 12, the controller 34 preferably includes a microcomputer with a control program that controls the terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the terminal 24 as appropriate, in a conventional manner. It will be apparent to those skilled in the art from this disclosure that the precise structure and algorithms for the controller 34 can be any combination of hardware and software that will carry out the functions of the present disclosure.

In an embodiment, a terminal 24 can be any IoT (Internet of Things) device. More specifically, a terminal 24 can be any IoT device which utilizes a Low Earth Orbit (LEO) satellite network. Individual IoT devices that use LEO satellite networks require a direct line of sight to a satellite 14 to transmit data. Thus, as a standalone unit, an individual IoT device can experience blockage during periods when there is no direct line of sight to a satellite 14. As discussed in more detail below, the methods of the present disclosure enable an IoT device to expedite the transmission of data to a base station 12 via a satellite 14 regardless of such blockages. The base station 12 is configured to process the data received from the IoT devices.

In an embodiment, a terminal 24 can be an IoT device which is deployed to monitor a condition. The condition can be, for example, a technological condition or an environmental condition. For example, in one embodiment, a terminal 24 can be an IoT device which is deployed to monitor toxic gases in an environment such as a forest or urban canyon. The terminal 24 can include or be placed in communication with one or more data collecting device 44 which includes one or more sensor configured to collect sensor data for eventual transmission to the base station 12 via the satellite 14. In this embodiment, the sensor data includes toxic gas measurements. In this embodiment, the measurements performed by the sensors are intended to be transmitted to the base station 12 via the satellite 14 so that the measurements can be processed by the base station 12. However, in environments such as forests and urban canyons, such terminals 24 can be blocked and not have a direct line of sight to any satellite 14 for an extended period of time. Such terminals 24 can therefore be unable to transmit data to a satellite 14 for extended periods of time, which can be problematic with urgent measurements, for example, related to toxic gases. As explained in more detail below, the present disclosure enables such terminals 24 to expedite the transmission of data to the satellite 14 and thus the base station 12 regardless of such blockages.

In another embodiment, a terminal 24 can be an IoT device which is deployed to monitor power usage. As with above, the terminal 24 can include or be placed in communication with one or more data collecting device 44 which includes one or more sensor configured to collect sensor data for eventual transmission to the base station 12 via the satellite 14. In this embodiment, the sensor data includes power usage data. The terminals 24 can be placed, for example, at different power usage stations in a local vicinity. The power usage stations can correspond, for example, to different residences in the local vicinity or to different machinery or software being run within the local vicinity. The local vicinity can be an environment such as a forest and/or urban canyon as described above, where terminals 24 can be blocked and not have a direct line of sight to any satellite 14 for an extended period of time.

In another embodiment, a terminal 24 can be an IoT device which is deployed to monitor wildlife activity. As with above, the terminal 24 can include or be placed in communication with one or more data collecting device 44 which includes one or more sensor configured to collect sensor data for eventual transmission to the base station 12 via the satellite 14. In this embodiment, the sensor data includes wildlife activity data. The wildlife activity data can include, for example, one or more of motion data from a motion sensor, video data from a video sensor, audio data from an audio sensor, and/or other types of similar data from other types of sensors which indicate wildlife activity. The terminals 24 can be placed, for example, at different locations within environments such as forests and/or canyons as described above, where terminals 24 can be blocked and not have a direct line of sight to any satellite 14 for an extended period of time.

In another embodiment, a terminal 24 can be a very small aperture terminal (VSAT) with a downlink/uplink transceiver 32. Each VSAT can collect user data from one or more data supplying devices 44 such as desktop computers, laptop or notebook computers, tablets (e.g., iPads), smart phones, smart TVs and any other suitable devices. Each VSAT can also enable the plurality of end user devices 44 to access a data network such as the Internet 28 via the base station 12. The VSAT can also enable an end user device 44 to access the data network to obtain a satellite service such as cable television.

FIGS. 2A to 2D illustrate an example embodiment in which the first terminal 24A and the second terminal 24B communicate with a satellite 14 that is traveling along a satellite path SP. Here, the first terminal 24A and the second terminal 24B are physically separate but have been arranged in a local group, as explained in more detail below. Although only two terminals 24 are shown in FIGS. 2A to 2D, it should be understood from this disclosure that the two terminals 24 are shown for simplicity and that the systems and methods discussed herein can include or be performed with more than two terminals 24. Likewise, although only one satellite 14 is shown in FIGS. 2A to 2D, it should be understood from this disclosure that only one satellite 14 is shown for simplicity and that the systems and methods discussed herein can include or be performed with more than one satellite 14. It should further be understood from this disclosure that using additional numbers of terminals 24 and satellites 14 in accordance with the methods discussed herein will further decrease the time for data to be transmitted from the terminals 24 to the base station 12 for processing.

Figure 2A:
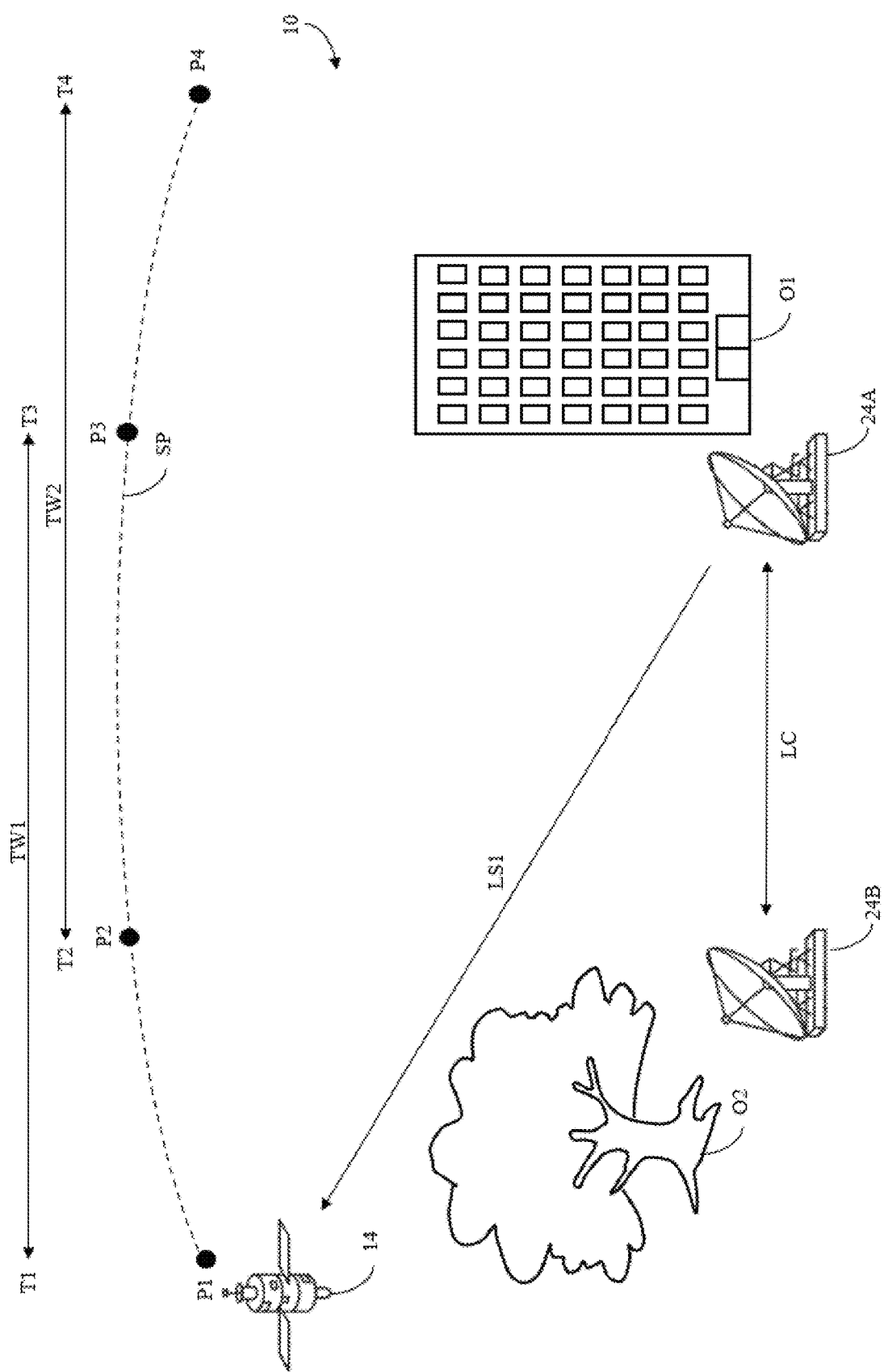
FIGS. 2A to 2D illustrate an example embodiment of the satellite communication network of FIG. 1 in a configuration in which individual terminals experience blockage at various stages.
Figure 2B:
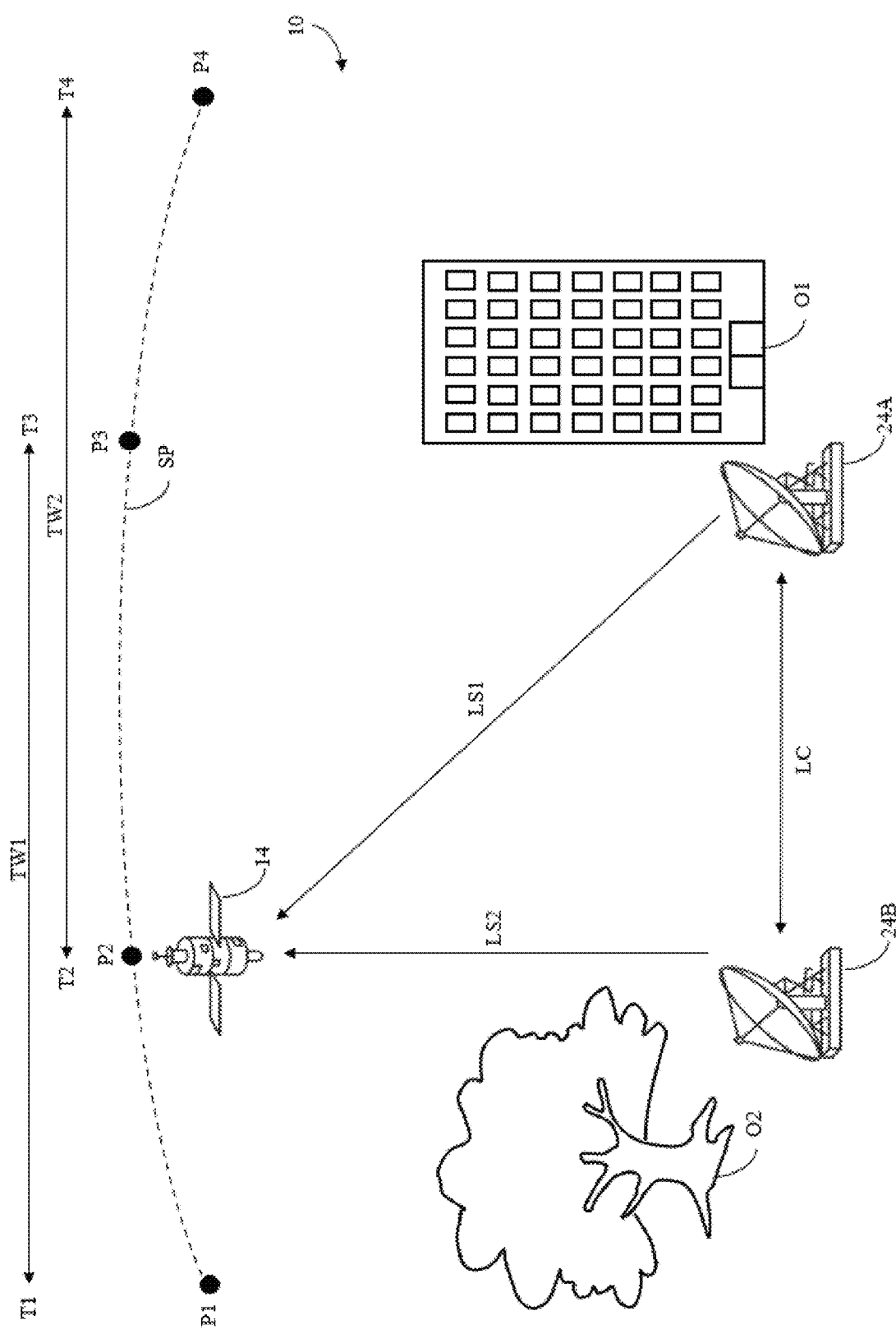
Figure 2C:
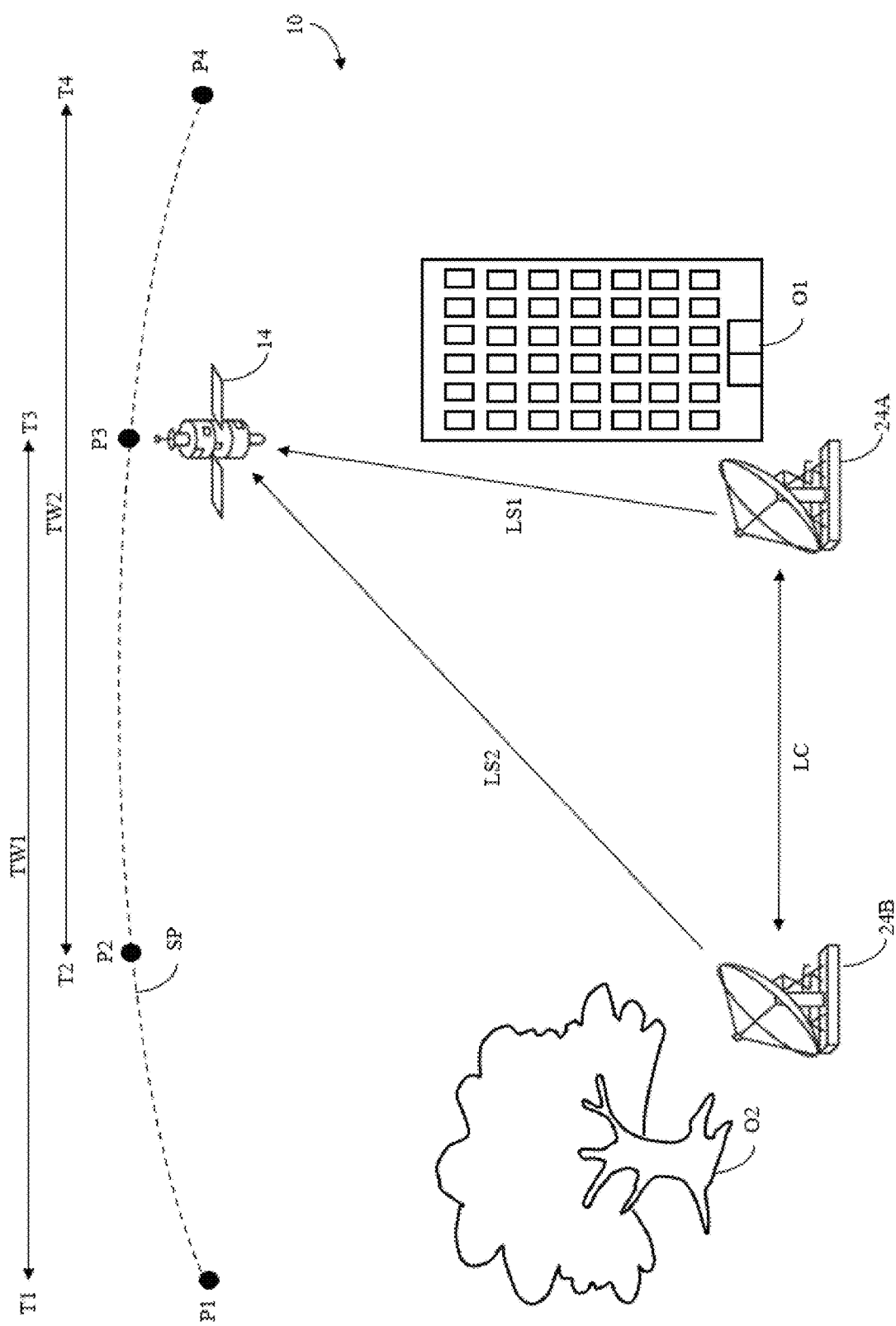
Figure 2D:
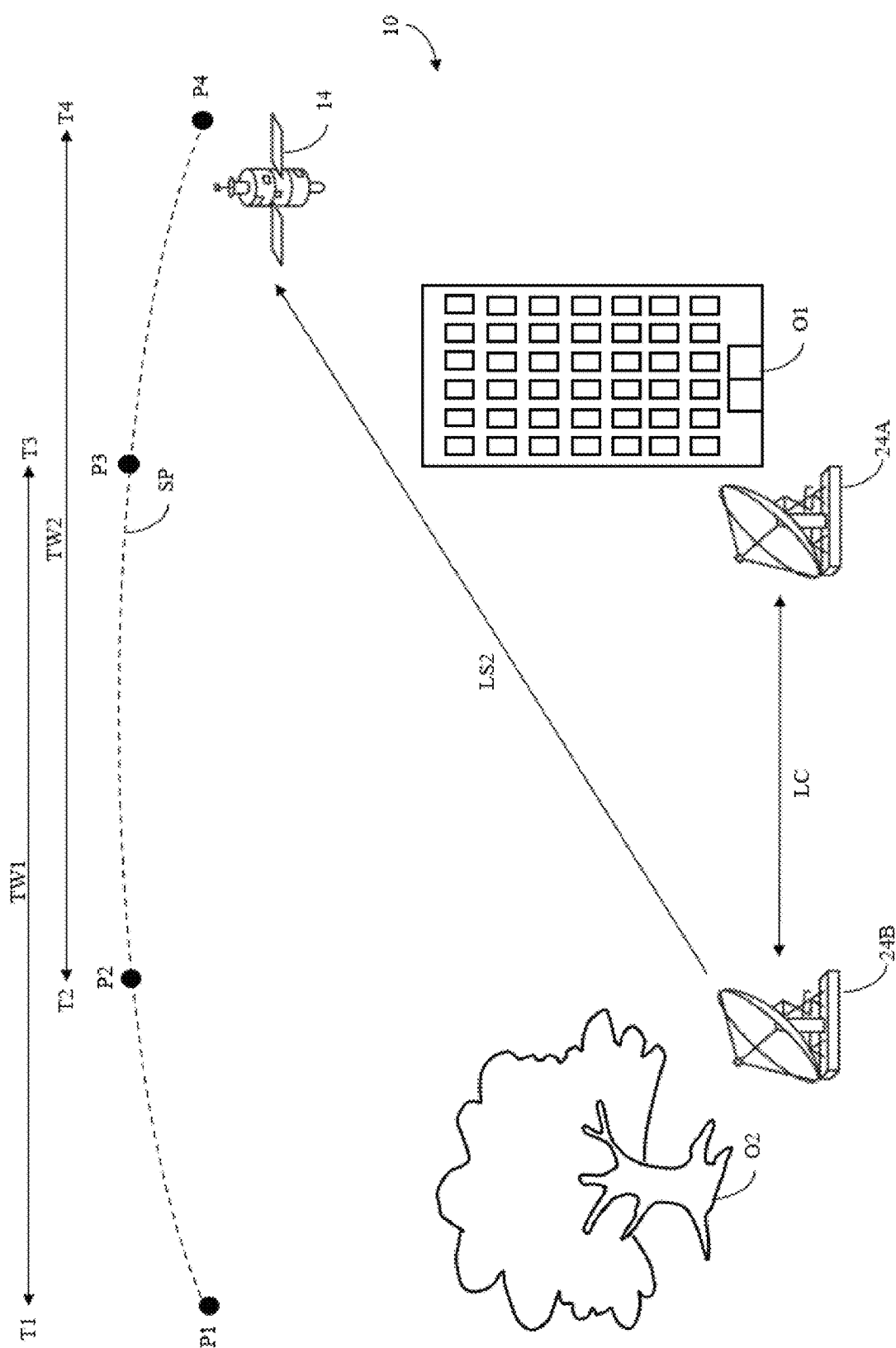

In the illustration shown in FIGS. 2A to 2D, the satellite 14 moves from left to right along the satellite path SP. More specifically, the satellite 14 moves from a first position P1 along the satellite path SP at a time T1 (FIG. 2A), to a second position P2 along the satellite path SP at a time T2 (FIG. 2B), to a third position P3 along the satellite path SP at a time T3 (FIG. 2C), to a fourth position P4 along the satellite path SP at a time T4 (FIG. 2D). The satellite path SP, including the first position P1, the second position P2, the third position P3 and the fourth position P4, can be stored as satellite ephemeris information which can be transmitted to or stored by the first terminal 24A and the second terminal 24B. In an embodiment, the satellite path SP is generally constant or predictable as the satellite 14 repeatedly orbits the Earth, such that the positions along the satellite path SP are easily determined from the satellite ephemeris information.

FIG. 2A shows the satellite 14 in the first position P1 along the satellite path SP. When the satellite 14 is in the first position P1, the first terminal 24A has a direct line of sight LS1 with the satellite 14. Thus, the first terminal 24A is configured to directly communicate with the satellite 14 at the time T1 when the satellite is in the first position P1. However, when the satellite 14 is in the first position P1, the second terminal 24B is at least partially blocked from a direct line of sight with the satellite 14 by an obstacle O2 (here, e.g., a tree). Thus, the second terminal 24B cannot transmit data to the satellite 14 at the time T1. The second terminal 24B is limited to a local connection LC with the first terminal 24A at the time T1 while the satellite 14 is in the first position P1.

FIG. 2B shows the satellite 14 in the second position P2 along the satellite path SP. When the satellite 14 reaches the second position P2, the second terminal 24B gains a direct line of sight LS2 with the satellite 14. The first terminal 24A also maintains its direct line of sight LS1 with the satellite 14. Thus, both the first terminal 24A and the second terminal 24B are configured to directly communicate with the satellite 14 when the satellite 14 is in the second position P2 at the time T2. The first terminal 24A and the second terminal 24B are also configured to communicate with each other via the local connection LC at the time T2 while the satellite 14 is in the second position P2.

FIG. 2C shows the satellite 14 in the third position P3 along the satellite path SP. Here, the first terminal 24A maintains its direct line of sight LS1 with the satellite 14 when the satellite 14 in the third position P3 at the time T3. Likewise, the second terminal 24B maintains its direct line of sight LS2 with the satellite 14 when the satellite 14 in the third position P3 at the time T3. Thus, both the first terminal 24A and the second terminal 24B are configured to directly communicate with the satellite 14 when the satellite 14 is in the third position P3 at the time T3. The first terminal 24A and the second terminal 24B are also configured to communicate with each other via the local connection LC at the time T3 while the satellite 14 is in the third position P3.

FIG. 2D shows the satellite 14 in the fourth position P4 along the satellite path SP. When the satellite 14 reaches the fourth position P4, the second terminal 24B maintains its direct line of sight LS2 with the satellite 14. Thus, the second terminal 24B is configured to communicate with the satellite 14 at the time T4 when the satellite 14 is in the fourth position P4. However, the first terminal 24A loses its a direct line of sight LS1 with the satellite 14 because the first terminal 24A is at least partially blocked from a direct line of sight with the satellite 14 by an obstacle O1 (here, e.g., a building). Thus, the first terminal 24A cannot transmit data to the satellite 14 at the time T4. The first terminal 24A is limited to a local connection LC with the second terminal 24B at the time T4 while the satellite 14 is in the fourth position P4.

The satellite 14 is configured to relay data to the base station 12 when in the first position P1, the second position P2, the third position P3, the fourth position P4, or any other position along the satellite path SP. However, each of the first terminal 24A and the second terminal 24B is limited to a specific time window (e.g., a transmission window) in which it can transmit data to the satellite 14 and thus the base station 12. The first terminal 24A has a first transmission window TW1 in which it has a direct line of sight with the satellite 14. As shown in FIGS. 2A to 2D, the first transmission window TW1 begins at the time T1 and ends at the time T3. The second terminal 24B has a second transmission window TW2 in which it has a direct line of sight with the satellite 14. As shown in FIGS. 2A to 2D, the second transmission window TW2 begins at the time T2 and ends at the time T4.

The systems and methods discussed herein enable both the first terminal 24A and the second terminal 24B to expedite the transmission of data to the base station 12 via the satellite 14 regardless of where the satellite 14 is located along the satellite path SP. More specifically, systems and methods discussed herein utilize local communication between the first terminal 24A and the second terminal 24B so that combined data from the first terminal 24A and the second terminal 24B can be transmitted to the base station 12 via the satellite 14 at the earliest possible time. This way, data from the first terminal 24A is able to reach the base station 12 outside of the first transmission window TW1, and data from the second terminal 24B is able to reach the base station 12 outside of the second transmission window TW2. Thus, the base station 12 can process data earlier than otherwise possible when the data is only transmitted from a terminal 24 to the base station 12 during a respective transmission window for that terminal 24.

Figure 3:
FIG. 3 illustrates an example embodiment of a method for transmitting data using the satellite communication network of FIGS. 1 and 2.

FIG. 3 illustrates an example embodiment of a method 100 for transmitting data according to the present disclosure. Some or all of the steps of method 100 can be stored as instructions on a memory 22 and/or a memory 36 and can be executed by a controller 20 and/or a controller 34 in accordance with the respective instructions stored on the memory 22 and/or the memory 36. It should be understood that some of the steps described herein can be reordered or omitted without departing from the spirit or scope of method 100.

At step 102, at least one terminal 24 is installed at a desired location. The desired location can be a physical location where the terminal 24 is authorized to be placed. The desired location can be marked by latitude or longitude coordinates. Installation of the terminal 24 at the desired location can include installation of an antenna dish 30 at the desired location.

In an embodiment, step 102 includes installation of the first terminal 24A at a first location and/or installation of the second terminal 24B at a second location. The first location can be marked by first latitude or longitude coordinates. The second location can be marked by second latitude or longitude coordinates which are different than the first latitude or longitude coordinates of the first location. Thus, the first terminal 24A can be installed at a physical location which is different from the physical location of the second terminal 24B. The first location can be within a predetermined distance of the second location. The predetermined distance can be a maximum distance to achieve a local wireless connection between the first terminal 24A and the second terminal 24B. Step 102 can further include installation of a third terminal 24, a fourth terminal 24, etc. as desired.

At step 104, a local group is created or updated. The local group includes a plurality of terminals 24. The local group can be created to include a plurality of terminals 24, or the local group can be updated to add one or more additional terminal 24 which was not previously included. In an embodiment, the local group can be created at the time that one or more terminal 24 is installed at step 102. Alternatively, the local group can already exist at the time that one or more new terminal 24 is installed at step 102, and can be updated to include the one or more new terminal 24. Thus, for example, the local group can be created or updated to include the first terminal 24A and/or the second terminal 24B. In an embodiment, one of the first terminal 24A and the second terminal 24B can be added to a local group which already includes the other of the first terminal 24A and the second terminal 24B.

Here, a local connection is established between terminals 24 in the local group. For example, a local connection is established between the first terminal 24A and the second terminal 24B. The local connection can be established before, during or after formation of the local group. Each terminal 24 in the group is also configured to separately communicate with a base station 12 via at least one satellite 14. For example, the first terminal 24A and the second terminal 24B are each configured to separately communicate with a base station via at least one satellite.

To enable the local group to be configured as described herein, each terminal 24 can be configured with a cryptographic key during installation. The cryptographic key can identify the local group. The cryptographic key can also provide secure communication between terminals 24 belonging to the local group, for example, between the first terminal 24A and the second terminal 24B via the local connection.

In an embodiment, the local group can be formed by direct communication between terminals 24 via a local connection. For example, the local group can be formed by the first terminal 24A and the second terminal 24B communicating directly with each other via a local connection. Each terminal 24 can use a multicast or a unicast protocol to discover one or more other reachable terminal 24 that belongs to the local group. Thus, one of the first terminal 24A and the second terminal 24B can use a multicast or a unicast protocol to discover the other of the first terminal 24A and the second terminal 24B. The terminals 24 can also use the multicast or the unicast protocol to transfer data packets to another terminal 24, as discussed in more detail below.

In an embodiment, the local group is configured to be coordinated by the base station 12. For example, a terminal 24 can communicate with the base station 12, and the base station 12 can assign the terminal 24 to a local group in the area. For example, the base station 12 can assign the first terminal 24A to a local group already including the second terminal 24B, or vice versa. Alternatively, the first terminal 24A and the second terminal 24B can form the local group and then communicate with the base station 12 to inform the base station 12 of the local group.

The local group can include the same types of terminals 24. Alternatively, the local group can include different types of terminals 24. Likewise, the terminals 24 in the local group can be distributed to and/or controlled by the same entity. Alternatively, the terminals 24 in the local group can be distributed to and/or controlled by different entities. For example, the terminals 24 can be located within and/or controlled by different households or businesses in a local community. In an example embodiment, if the terminals 24 are VSATs as discussed above, the VSATs in a local group can be located in different neighboring households. Likewise, the VSATs can be located in different businesses which cooperate to efficiently transmit data.

At step 106, which can occur prior to, simultaneously with, or after one or more of the previously described steps, a terminal 24 is configured for communication with the base station 12 via one or more satellite 14. The terminal 24 can be newly installed and/or newly added to a local group (e.g., the first terminal 24A and/or the second terminal 24B). During configuration, the terminal 24 accesses satellite ephemeris data for one or more satellite 14 which the terminal 24 can use to transmit data packets to the base station 12. Using the example embodiment of FIGS. 2A to 2D, the satellite ephemeris information can include information regarding a satellite path SP of a satellite 14, specific locations P1, P2, P3, P4 along the satellite path, corresponding times T1, T2, T3, T4 that the satellite 14 will be located at the respective positions P1, P2, P3, P4, and/or any other information regarding the orbit of the satellite 14. In an embodiment, the satellite ephemeris information can be programmed into the memory 36 of the terminal 24 at the time of installation. In another embodiment, the satellite ephemeris information can be received from the base station 12 and/or the satellite 14 during or after installation of the terminal 24. In yet another embodiment, the satellite ephemeris information can be received from another terminal 24 in the same local group via direct communication over the local connection.

At step 108, transmission data is determined for the terminal 24. The transmission data can include one or more transmission window (e.g., time period) in which the terminal 24 can or cannot transmit data to a respective satellite 14. The transmission windows can be determined using the satellite ephemeris information, for example, by determining when the satellite 14 should be within range of the terminal 24 based on the known satellite path SP. The transmission windows can further be determined by sending test signals back and forth between the terminal 24 and the satellite 14 (e.g., or with the base station 12 via the satellite 14) when the satellite 14 should be within range of the terminal 24 based on the known satellite path SP.

The transmission windows can be determined by determining one or more blockage period for the terminal 24. A blockage period is a time period that the terminal 24 should be able to transmit data to the satellite 14 because the satellite 14 is within range of the terminal 24, but the terminal 24 still cannot effectively transmit data to the satellite 14. A blockage period can be due to a known or unknown obstacle being present between the terminal 24 and the satellite 14, thus blocking the direct line of sight from the terminal 24 to the satellite 14 at one or more location along the satellite path SP. Some obstacles can be permanent, while other obstacles can be temporary. By utilizing test signals between the terminal 24 and the satellite 14 when the satellite 14 should be in range of the terminal 24, effective transmission windows which take blockage periods into account can be determined for the terminal 24.

In the embodiment shown in FIGS. 2A to 2D, for example, the satellite 14 should be in range of the first terminal 24A from time T1 to time T4. However, the first terminal 24A is blocked by the obstacle O1 during the time T4. The first terminal 24A therefore has a first transmission window TW1 from time T1 to time T3, which takes into consideration a blockage period from time T3 to time T4. Likewise, the satellite 14 should be in range of the second terminal 24B from time T1 to time T4. However, the second terminal 24B is blocked by the obstacle O2 during the time T1. The second terminal 24B therefore has a second transmission window TW2 from time T2 to T4, which takes into consideration a blockage period from time T1 to time T2.

Thus, in the embodiment shown in FIGS. 2A to 2D, the transmission data for the first terminal 24A can include one or more of the time that the satellite 14 should be in range of the first terminal 24A (from time T1 to T4), the first transmission window TW1 (from time T1 to time T3), and/or the first blockage period (at time T4). Likewise, the transmission data for the second terminal 24B can include one or more of the time that the satellite 14 should be in range of the second terminal 24B (from time T1 to T4), the second transmission window TW2 (from time T2 to time T4), and/or the second blockage period (at time T1).

Each terminal 24 is configured to store its own transmission data in its memory 36. In an embodiment, the memory 36 of each terminal 24 in the local group can also store some or all of the transmission data of the other terminals 24 in the local group. For example, the first terminal 24A can store transmission data from the second terminal 24B. As described in more detail below, the first terminal 24A can use the stored transmission data from the second terminal 24B to determine that that the second terminal 24B can transmit data to the satellite 14, and thus the base station 12, during the second transmission window TW2 from time T2 to T4. Likewise, the second terminal 24B can store transmission data from the first terminal 24A. The second terminal 24B can use the stored transmission data from the first terminal 24A to determine that that the first terminal 24A can transmit data to the satellite 14, and thus the base station 12, during the first transmission window TW1 from time T1 to T3. Alternatively, however, the method 100 can proceed without the terminals 24 storing the precise transmission periods for other terminals 24 in the local group.

In an embodiment, step 106 and/or step 108 can be omitted. In this embodiment, each terminal 24 can determine whether it can or cannot transmit data to the satellite 14 on the fly, rather than predetermining transmission windows. Alternatively, each terminal 24 within a local group can transmit data packets to other terminals 24 within a local group as described herein regardless of specific transmission windows.

At step 110, a terminal 24 creates a data packet intended to be transmitted to the base station 12 via a satellite 14. The data packet can include target data, for example, such as the user data or sensor data discussed above. The target data can be captured by the terminal 24 that creates the data packet. The data packet can include a unique identifier for the terminal 24 which creates the data packet. The data packet can include the time that the data packet is created at the terminal 24. The data packet can include the time that the data packet is captured at the terminal 24. Thus, in an embodiment, the data packet can include (i) a unique identifier for the terminal 24 which creates the data packet, (ii) the target data, and (iii) the time that the data packet is created at the terminal 24.

Here, the terminal 24 can be, for example, the first terminal 24A discussed above. The data packet can be a first data packet created by the first terminal 24A. The method 100 discussed herein is advantageous when the first terminal 24A creates a first data packet outside of the first transmission window TW1, for example, during a blockage period. The terminal 24 which creates the data packet can also be the second terminal 24B, but the rest of the method 100 will be described with respect to the first terminal 24A for simplicity. It should be understood from this disclosure, however, that the second terminal 24B can operate as described herein with respect to the first terminal 24A.

In an embodiment, the first terminal 24A continuously collects target data. At the time that the first data packet is created, the first terminal 24A aggregates all target data that has been collected but not yet transmitted to the base station 12. The first data packet can also include data packets received from other terminals 24 which are intended to be transmitted to the base station 12.

At step 112, the first terminal 24A determines when the first data packet can be transmitted to the base station 12 via the satellite 14. For example, it can be determined whether the first terminal 24A is currently within the first transmission window TW1. If the first terminal 24A is within the first transmission window TW1, then the first terminal 24A can transmit a copy of the first data packet to the base station 12 via the satellite 14 at step 114. If the first terminal 24A is not within the first transmission window TW1, then the method 100 can proceed to step 116. In an embodiment, the first terminal 24A is configured to determine whether transmission via the satellite 14 is possible by attempting to transmit the first data packet to the base station 12. If the transmission is not successful, then the method 100 can proceed to step 116.

At step 114, the terminal 24 transmits a copy of the data packet to the base station 12 via the satellite 14, if possible. More specifically, the first terminal 24A transmits the copy of the first data packet to the base station 12 via the satellite 14. The first terminal 24A can then delete the first data packet from its memory 36 and return to step 110 for the creation of another data packet.

At step 116, the first terminal 24A has determined that it cannot currently transmit the data packet to the base station 12 via the satellite 14. For example, the first terminal 24A (i) has determined that it is not currently within the first transmission window TW1, or (ii) was unable to successfully transmit a copy of the first data packet at step 112. The first terminal 24A is configured to then determine when the next transmission opportunity will occur. The next transmission opportunity can be, for example, at the time T1 when the first transmission window T1 opens. The first terminal 24A is configured to add data regarding the next transmission opportunity to the first data packet. The data can include an expected transmission time which indicates when the next transmission opportunity for the first terminal 24A will occur. The first terminal 24A is configured to then transmit a copy of the first data packet to the second terminal 24B via the local connection at step 118. The first terminal can also be configured to transmit respective copies of the first data packet to other terminals 24 in the local group at step 118.

The first terminal 24A also stores the first data packet in its memory 36. The first terminal 24A then transmits a copy of the first data packet to the base station 12 via the satellite 14 at its next transmission opportunity at step 120. Here, the next transmission opportunity is at the expected transmission time which was also added to the first data packet before transmission to the second terminal 24B. In an embodiment, the first terminal 24A is configured to transmit the first data packet to the base station 12 via the satellite 14 at the expected transmission time, regardless of the next transmission opportunity for the second terminal 24B.

In an embodiment, the first terminal 24A stores the transmission data for the second terminal 24B and/or other terminal(s) 24 within the local group. The first terminal is configured to analyze this transmission data and determine whether the second terminal 24B and/or another terminal(s) 24 has a transmission window that is earlier than the expected transmission time for the first terminal 24A to transmit the first data packet to the base station 12 via the satellite. For example, the first terminal 24A can store at least one expected transmission opportunity for the second terminal 24B in the memory 36 of the first terminal 24A. The first terminal 24A is configured to then use this information to determine whether and where to transmit the first data packet via the local connection. For example, if the first terminal 24A determines that the next transmission opportunity of the second terminal 24B will be earlier than the expected transmission time of the first terminal 24A, the first terminal 24A transmits the first data packet to the second terminal 24B. Alternatively, the first terminal 24A is configured to send copies of the first data packet to all terminals 24 in the local group. Those terminals 24 are configured to then determine whether they will have a transmission opportunity that is earlier than the expected transmission time of the first terminal 24A.

At step 118, the second terminal 24B has received the first data packet including one or more of: (i) a first unique identifier for the first terminal 24A which created the data packet, (ii) the first target data, (iii) the first time that the first data packet was created at the first terminal 24A, and/or (iv) the expected transmission time for the first terminal 24A to transmit the first data packet to the base station 12 via the satellite 14. Other terminals 24 in the local group can have received the same data. By transmitting the first data packet from the first terminal 24A to the second terminal 24B via the local connection, the first terminal 24A is configured to enable the first data packet to be transmitted to the base station 12 via the satellite 14 even when the first terminal 24A experiences a blockage period.

At step 122, the second terminal 24B determines its next transmission opportunity to transmit data to the base station 12 via the satellite 14. For example, it can be determined whether the second terminal 24B is currently within the second transmission window TW2. If the second terminal 24B is within the second transmission window TW2, the second terminal 24B can transmit a copy of the first data packet to the base station 12 via the satellite 14 at step 124. Here, the second terminal 24B is configured to aggregate its own second data packet(s) with the first data packet and transmit an aggregated data packet to the base station 12 via the satellite 14 at step 124. In an embodiment, the second terminal 24B is configured to wait until its next transmission opportunity to perform step 122. The method 100 discussed herein is advantageous, for example, when the second terminal 24 has a transmission window which is earlier than the expected transmission time of the first terminal 24A.

If, at step 122, the second terminal 24B determines that its next transmission opportunity to transmit data to the base station 12 via the satellite 14 will occur after the expected transmission time for the first terminal 24A to transmit the first data packet to the base station 12 via the satellite 14, then second terminal 24B is configured to delete the first data packet at step 126. Here, the second terminal 24B is configured to delete the first data packet without transmitting a copy of the first data packet to the base station 12 via the satellite 14, since the first terminal 24A will have already transmitted a copy of the first data packet to the base station 12 or will transmit a copy of the first data packet to the base station 12 before the second terminal 24B receives the opportunity. In an embodiment, the second terminal 24B is configured to attempt to transmit a copy of the first data packet to the base station 12 via the satellite 14. If the transmission is not successful, then the second terminal 24B is configured to keep attempting to transmit copies of the first data packet to the base station 12 via the satellite 14 until after the expected transmission time for the first terminal 24A, at which time the second terminal is configured to delete the first data packet at step 126.

Thus, when a next transmission opportunity for the second terminal 24B to transmit data via the at least one satellite 14 is earlier than the expected transmission time for the first terminal 24A, the second terminal 24B transmits the first data packet from the second terminal 24B to the base station 12 via the at least one satellite 14. When the next transmission opportunity for the second terminal 24B to transmit data via the at least one satellite 14 is later than the expected transmission time, the second terminal 24B deletes the first data packet.

At step 124, a copy of the first data packet is transmitted from the second terminal 24B to the base station 12 via the satellite 14. Here, the second terminal 24B is configured to aggregate the first data packet with a second data packet created at the second terminal 24B, and can transmit an aggregated data packet to the base station 12 via the satellite 14. The aggregated data packet can include the first data packet and the second data packet. After transmitting the aggregated data packet at step 124, the second terminal 24B is configured to delete the first data packet from its memory 36.

At step 128, the base station 12 receives a first copy of the first data packet via the satellite 14. The base station 12 receives the first copy of the first data packet as sent by the second terminal 24B at step 124. The base station 12 can also receive a second copy of the first data packet as sent by the first terminal 24A at step 120. Thus, the base station 12 twice receives the first data packet: one copy from the first terminal 24A, and one copy from the second terminal 24B. This ensures that the first data packet is transmitted to the base station 12 at the earliest possible instant when either the first terminal 24A or the second terminal 24B has an effective transmission period in which a direct line of sight can be established with the satellite 14. This also ensures that the base station 12 receives the first data packet from the first terminal 24A, if the second terminal 24B is not able to transmit during an expected transmission window, since the first terminal 24A will not have information regarding whether transmission has been successful from the second terminal 24B. At step 128, the base station can process the copy of the first data packet which is received first, thus ensuring that the first data packet is processed in the most expedited manner possible.

At step 130, if the base station 12 has received multiple copies of the first data packet, the base station 12 is configured to then purge duplicate data by checking the unique identifier for the terminal 24 which created the data packet and/or the time that the data packet was created against other received data packets. For example, if the base station 12 received copies of the first data packet from both the first terminal 24A and the second terminal 24B, the base station 12 will be storing two first data packets with identical unique identifiers for the first terminal 24A and times that the data packet was captured at the first terminal 24A. The base station 12 is configured to then delete the extra copy of the first data packets so as not to duplicate information and/or waste space on the memory 22.

Thus, the base station 12 processes one of a first copy of the first data packet received from the second terminal 24B and a second copy of the first data packet received from the first terminal 24A. The base station 12 then deletes the other of the first copy of the first data packet received from the second terminal 24B and the second copy of the first data packet received from the first terminal 24A. The processed copy can be the first received copy at the base station 12 via the at least one satellite 14. Either the first copy or the second copy can be the first received copy at the base station 12. Here, the base station 12 can process one of the first copy or the second copy before the other of the first copy and the second copy is received at the base station 12.

Figure 4:
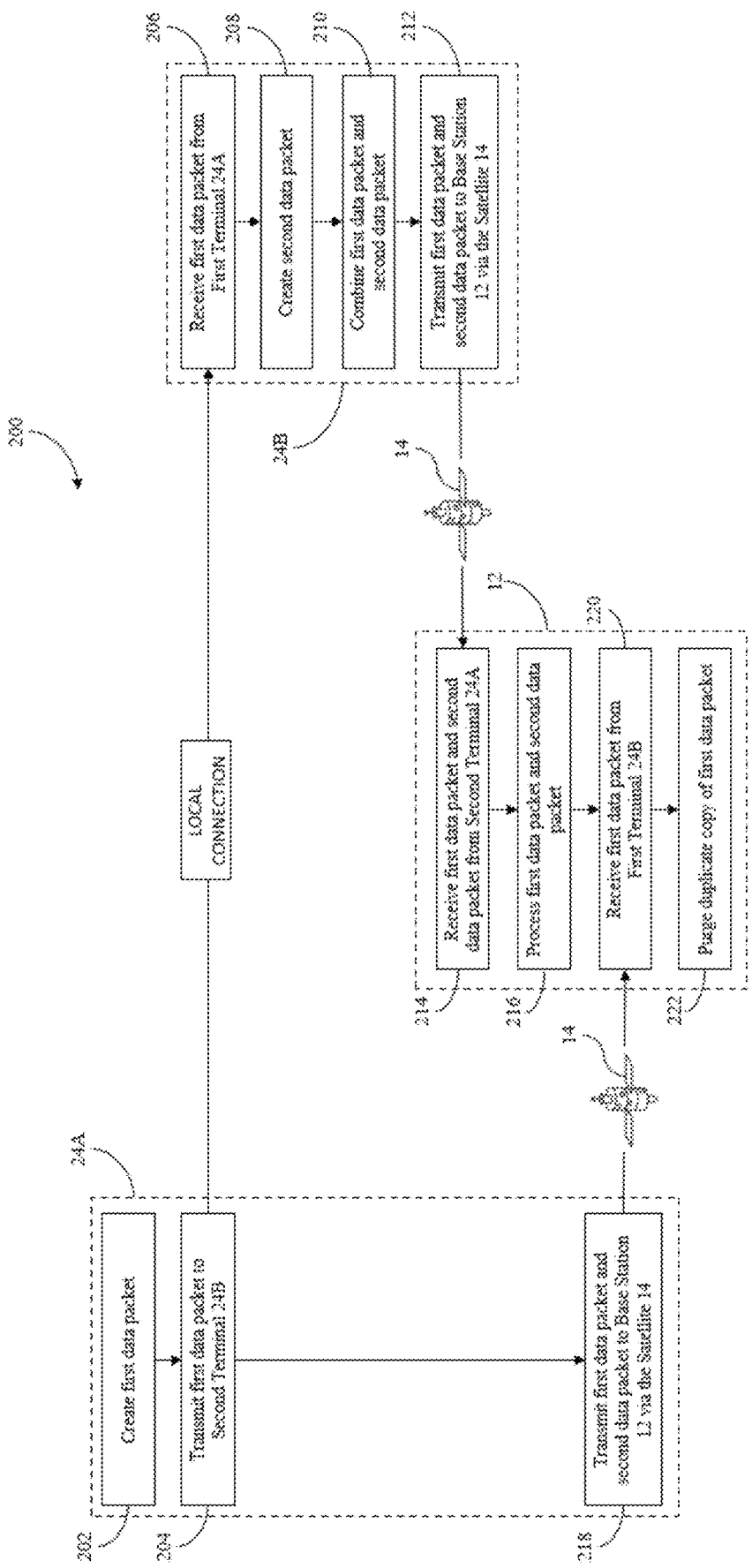
FIG. 4 illustrates another example embodiment of a method for transmitting data using the satellite communication network of FIGS. 1 and 2.

FIG. 4 illustrates another example embodiment of a method 200 for transmitting data according to the present disclosure. More specifically, the method 200 illustrates a more detailed implementation of steps 110 to 130 of method 100 using the example embodiment of FIGS. 2A to 2D. Some or all of the steps of method 200 can be stored as instructions on a memory 22 and/or a memory 36 and can be executed by a controller 20 and/or a controller 34 in accordance with the respective instructions stored on the memory 22 and/or the memory 36. It should be understood that some of the steps described herein can be reordered or omitted without departing from the spirit or scope of method 200.

In method 200 of FIG. 4, each of the first terminal 24A, the second terminal 24B, and the base station 12 are illustrated to further demonstrate where and when processing and data transmission can occur. It should be understood from this disclosure that this is as an example only and is not intended to be limiting. In FIG. 4, it should further be understood that the first terminal 24A and the second terminal 24B have already been set up as a local group as described herein.

At step 202, the first terminal 24A creates a first data packet intended to be transmitted to the base station 12 via a satellite 14. The first data packet can include first target data, for example, such as the user data or sensor data discussed above. Thus, the first data packet can include (i) a first unique identifier for the first terminal 24A, (ii) the first target data, and (iii) a first time that the first data packet is created at the first terminal 24A. The first data packet can be stored in the memory 36 of the first terminal 24A.

In an embodiment, the first terminal 24A continuously collects target data. At the time that the first data packet is created, the first terminal 24A aggregates all target data that has been collected but not yet transmitted to the base station 12. The first data packet can also include data packets received from other terminals 24 which are intended to be transmitted to the base station 12. For example, in an embodiment, another terminal 24 has already sent the first terminal 24A a data packet in accordance with the method discussed herein.

If step 202 is performed within the first transmission window for the first terminal 24A, then the first terminal 24A is configured to transmit a copy of the first data packet directly to the base station 12 via the satellite 14. Here, however, step 202 is being performed at a time outside of the first transmission window TW1 for the first terminal 24A. For example, referring against to FIGS. 2A to 2C, step 202 can be performed between time T3 and time T4, which is outside of the first transmission window TW1 of time T1 to time T3.

At step 204, the first terminal 24A transmits a copy of the first data packet to the second terminal 24B via the local connection. Here, the first terminal 24A also adds its expected transmission time (e.g., the time of its next transmission opportunity via satellite 14) to the first data packet. Thus, the copy of the first data packet transmitted to the second terminal 24B includes (i) the first unique identifier for the first terminal 24A, (ii) the first target data, (iii) the first time that the first data packet is created at the first terminal 24A, and (iv) the expected transmission time for the first terminal 24A to transmit a copy of the first data packet to the base station 12 via the satellite 14. Here, the first terminal 24A also stores the first data packet in its memory 36 for transmission to the base station 12 via the satellite at the expected transmission time.

In an embodiment, the first terminal 24A attempts to transmit a copy of the first data packet to the base station 12 via the satellite 14 before performing step 204. If the first terminal 24A is able to transmit a copy of the first data packet to the base station 12 via the satellite 14, for example, then the first terminal 24A does not transmit a copy of the first data packet to the second terminal 24B via the local connection. Instead, the first terminal 24A transmits a copy of the first data packet directly to the base station 12 via the satellite 14 and then deletes the first data packet from its memory 36.

After the first terminal 24A transmits the copy of the first data packet to the second terminal 24B via the local connection and stored the first data packet in its memory 36, the first terminal 24A begins aggregating target data for another data packet. Thus, in an embodiment, the first terminal 24A is continuously aggregating target data and creating data packets for transmission to the base station 12.

At step 206, the second terminal 24B receives a copy of the first data packet from the first terminal 24A. The second terminal 24B can then store the first data packet in its memory 36.

At step 208, which can be performed before or simultaneously with step 206, the second terminal 24B creates a second data packet intended to be transmitted to the base station 12 via a satellite 14. The second data packet can include second target data, for example, such as the user data or sensor data discussed above. The second data packet can include (i) a second unique identifier for the second terminal 24, (ii) the second target data, and (iii) a second time that the second data packet is created at the second terminal 24B. The second data packet can be stored in the memory 36 of the second terminal 24B.

In an embodiment, the second terminal 24B continuously collects target data. At the time that the second data packet is created, the second terminal 24B aggregates all target data that has been collected but not yet transmitted to the base station 12. The second data packet can also include data packets received from other terminals 24 in accordance with the methods discussed herein.

At step 210, the second terminal 24B determines that it can transmit the data via the satellite 14 prior to the expected transmission time for the first terminal 24A to transmit the first data packet via the satellite 14. The second terminal 24B is configured to make this determination, for example, by comparing its second transmission window TW2 to expected transmission time for the first terminal 24A which was received with the first data packet. The second terminal 24B therefore aggregates the first data packet and the second data packet into an aggregated data packet for transmission to the base station 12 via the satellite 14.

If, at steps 208 or 210, the second terminal 24B determined it cannot transmit a copy of the first data packet via the satellite 14 prior to the expected transmission time for the first terminal 24A, then the second terminal 24B is configured to delete the first data packet from its memory 36. Likewise, if the expected transmission time for the first terminal 24A to transmit the first data packet via the satellite has already passed by the time the second terminal performs steps 208 or 210, then the second terminal 24B is configured to delete the first data packet from its memory 36.

At step 212, the second terminal 24B transmits a copy of the first data packet and a copy of the second data packet to the base station 12 via the satellite 14. More specifically, the second terminal 24B transmits the aggregated data packet including copies of the first data packet and the second data packet. Step 212 can be performed, for example, during the second transmission window TW2 for the second terminal 24B. For example, using the embodiment of FIGS. 2A to 2D, step 212 can be performed between time T3 and time T4, which is outside of the first transmission window TW1 of time T1 to time T3 but within the second transmission window TW2 of time T2 to T4. Upon transmission, the second terminal 24B is configured to delete both the first data packet and the second data packet from its memory 36.

At step 214, the base station 12 receives copies of the first data packet and the second data packet via the satellite 14. More specifically, the base station 12 receives the aggregated data packet including copies of the first data packet and the second data packet. The base station 12 is configured to then store the aggregated data packet including copies of the first data packet and the second data packet using the memory 22. The base station 12 is also configured to check the first data packet and the second data packet against the other data packets stored in its memory. Since there are no other data packets with the same unique identifiers and corresponding creation times, the base station 12 is configured to determine that this is the first time it has received copies of the first data packet and the second data packet. The base station 12 is configured to then process the first data packet and/or the second data packet at step 216.

At step 218, the first terminal 24A is within a transmission window. For example, the expected transmission time for the first terminal 24A has arrived. Here, the first terminal 24A transmits a copy of the first data packet to the base station 12 via the satellite 14. In an embodiment, the first terminal 24A creates an aggregated data packet including the first data packet and other data packets created from target data collected since the creation of the first data packet. The other data packets can be created at the first terminal 24A or at other terminals 24 such as the second terminal 24B. The first terminal 24A is configured to then delete the first data packet from its memory 36. The first terminal 24 is also configured to delete other data packets transmitted to the base station 12.

At step 220, the base station 12 again receives a copy of the first data packet via the satellite 14. The base station 12 can store the copy of the first data packet using the memory 22 or proceed to step 222 without storing the copy of the first data packet.

At step 222, the base station 12 is configured to compare the copy of the first data packet received at step 214 to the copy of the first data packet received at step 220 (e.g., compare a first copy with a second copy). Since both copies of the first data packets have the same first unique identifiers and corresponding first creation times, the base station 12 is configured to determine that the copy of the first data packet received at step 220 is a duplicate. The base station 12 can therefore delete the copy of the first data packet received at step 220 from its memory 22.

As illustrated, the methods discussed herein enable the first data packet to be transmitted to the base station 12 via the satellite 14 faster than would have been possible if the first terminal 24A had merely waited for its next transmission opportunity. This allows the base station 12 to process the first data packet at step 216 before the first terminal 24A is able to transmit the first data packet at steps 218. It should be understood from this disclosure that the data processing is further expedited when additional terminals (e.g., third, fourth, etc.) are added to the local group.

Figure 5:
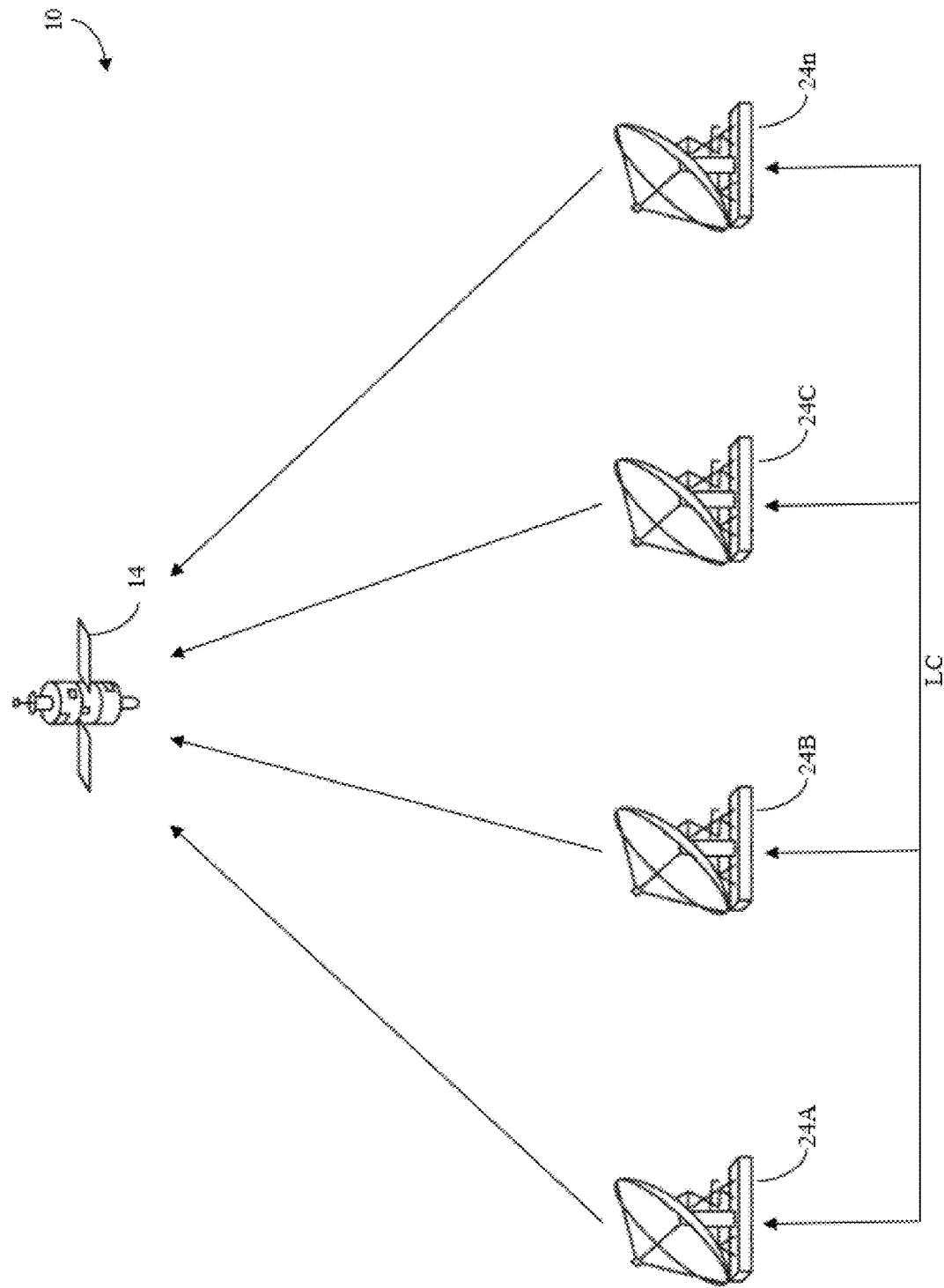
FIG. 5 illustrates another example embodiment of the satellite communication network of FIG. 1.

FIG. 5 illustrates an example embodiment in which the network 10 includes more than two terminals 24. Here, the network 10 comprises a plurality of terminals 24 including a first terminal 24A, a second terminal 24B, a third terminal 24C, and an nth terminal 24*n*. Each of the first terminal 24A, the second terminal 24B, the third terminal 24C, and the nth terminal 24*n* is configured to transmit data packets to the satellite 14. In this embodiment, a local group includes the first terminal 24A, the second terminal 24B, the third terminal 24C, and the nth terminal 24*n*. Thus, the first terminal 24A, the second terminal 24B, the third terminal 24C, and the nth terminal 24*n* are configured for direct communication via a local connection.

In the embodiment of FIG. 5, each of the terminals 24 is configured for a different transmission opportunity to the satellite 14. These transmission opportunities can be denoted as T0, T1, T2, T3 . . . Tn. Here, an expected transmission window includes two values. The first value is T0 and the second value is a future transmission opportunity time which is a factor of the number of terminals in the local group. The transmission window size is limited and decreases as the size of the group grows. Thus, in this embodiment, the first terminal 24A has a transmission window of T0-T1, the second terminal 24B has a transmission window of T0-T2, the third terminal 24C has a transmission window of T0-T3, and the nth terminal 24*n* has a transmission window of T0-Tn. The transmission windows can be stored by and/or determined by the terminals 24 based on the satellite ephemeris information as discussed above.

Here, each of the terminals 24 periodically aggregates data packets from the other terminals 24. If, for example, the first terminal 24A has a data packet to transmit, the first terminal 24A is configured to compute its next transmission opportunity and compare that next transmission opportunity with the expected transmission windows of the other terminals 24B, 24C . . . 24*n* in the local group. Any data packets in the memory 36 for the first terminal 24A for which an expected transmission window has already passed can be deleted. Since the terminals 24 are periodically aggregating data packets, the first terminal 24A is configured to delete data packets in the memory 36 which are not the most recently timestamped data packets from another terminal 24B, 24C, 24*n* in the local group.

If the first terminal 24A determines that its own transmission time T0 is first and has line of sight to the satellite 14 that is not blocked, then the first terminal 24A transmits all of its aggregated data, including data from the other terminals 24B, 24 . . . 24*n* in the local group, at time T0 and clears its memory 36 at that time.

Otherwise, if the first terminal 24A determines that its own transmission time T0 is not the first time relative to the expected transmission windows of the other terminals 24B, 24C . . . 24*n*, the first terminal 24A computes its next expected transmission time. The first terminal 24A then transmits all of its aggregated data, its next expected transmission time, its device identifier, and its timestamp to each of the other terminals 24B, 24C . . . 24*n* in the local group. The first terminal 24A also continues to aggregate data until it can next transmit to the satellite 14.

As discussed above, the base station 12 maintains a database in its memory 22 which is indexed by device identifiers and data creation times, which the base station 12 can use to filter out duplicate data that has been received from multiple terminals 24 via the satellite 14. Whenever a new data packet is received at the base station 12, the base station is configured to check the device identifier and data creation time against the database. If there is no matching entry, then the new data packet is processed by the base station 12 and entered into the database with the device identifier and data creation time. If there is already a matching entry in the database, then the new data packet is not processed and is discarded.

The embodiments described herein provide improved systems and methods for transmitting data using a satellite communication network. The improved systems and methods enable data transfers to occur even when terminals are blocked from transmitting to a satellite. It should be understood that various changes and modifications to the systems and methods described herein will be apparent to those skilled in the art and can be made without diminishing the intended advantages.

The embodiments described herein can be employed in, for example, the Jupiter satellite system deployed by Hughes Network Systems, any existing or previous HN/HX satellite modem platforms by Hughes Network Systems, as well as any present or future consumer, enterprise, or military/DISD (Defense and Intelligence Systems Division) satellite modem design, or other type of communication system as understood in the art.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for transmitting data using a satellite communication network, the method comprising:
    establishing a local connection between a first terminal and a second terminal, the first terminal and the second terminal each configured to separately communicate with a base station via at least one satellite;
    transmitting a first data packet from the first terminal to the second terminal via the local connection;
    transmitting a first copy of the first data packet from the second terminal to the base station via the at least one satellite;
    transmitting a second copy of the first data packet from the first terminal to the base station via the at least one satellite;
    processing, at the base station, one of (1) the first copy of the first data packet received from the second terminal and (2) the second copy of the first data packet received from the first terminal; and
    deleting, at the base station, the other of (1) the first copy of the first data packet received from the second terminal and (2) the second copy of the first data packet received from the first terminal.

2. The method of claim 1, further comprising
    attempting to transmit the first data packet from the first terminal via the at least one satellite before transmitting the first data packet from the first terminal to the second terminal via the local connection.

3. The method of claim 1, wherein
    the processing includes processing the one of the first copy of the first data packet and the second copy of the first data packet that is first received at the base station via the at least one satellite.

4. The method of claim 1, wherein
    at least one of: (i) the processing includes processing the first copy of the first data packet before the second copy of the first data packet is received at the base station; or (ii) the processing includes processing the second copy of the first data packet before the first copy of the first data packet is received at the base station.

5. The method of claim 1, further comprising
    at the second terminal, creating an aggregated data packet including the first data packet and a second data packet, and
    wherein transmitting the first copy of the first data packet from the second terminal to the base station via the at least one satellite includes transmitting the aggregated data packet from the second terminal to the base station via the at least one satellite.

6. The method of claim 1, further comprising
    collecting first target data at the first terminal, and
    creating the first data packet to include the first target data, a unique identifier for the first terminal, a time of creation of the first data packet, and an expected transmission time from the first terminal to the base station via the at least one satellite.

7. The method of claim 1, comprising
    transmitting the first data packet from the first terminal to the second terminal via the local connection upon determining that a next transmission opportunity for the second terminal to transmit to the base station via the at least one satellite will be earlier than an expected transmission time for the first terminal to transmit to the base station via the at least one satellite.

8. The method of claim 1, comprising
    prior to transmitting the first data packet from the first terminal to the second terminal via the local connection, adding data to the first data packet regarding a next transmission opportunity for the first terminal to transmit to the base station via the at least one satellite.

9. The method of claim 1, comprising
    storing, in a memory of the first terminal, at least one expected transmission opportunity for the second terminal to transmit to the base station via the at least one satellite, and
    transmitting the first data packet from the first terminal to the second terminal via the local connection based on the at least one expected transmission opportunity for the second terminal.

10. The method of claim 1, comprising
    transmitting the first data packet from the first terminal to the second terminal via the local connection upon determining that the first terminal is not currently within a transmission window in which the first terminal can transmit data to the base station via the at least one satellite.

11. The method of claim 1, comprising
transmitting the first data packet from the first terminal to the second terminal via the local connection upon determining that the first terminal was unable to successfully transmit a copy of the first data packet to the base station via the at least one satellite.

12. The method of claim 1, comprising
transmitting the first copy of the first data packet from the second terminal to the base station via the at least one satellite at a next transmission opportunity in which the second terminal has a direct line of sight with the at least one satellite, and
transmitting the second copy of the first data packet from the first terminal to the base station via the at least one satellite at a next transmission opportunity in which the first terminal has a direct line of sight with the at least one satellite.

13. A satellite communication network comprising:
a first terminal configured to collect first target data;
a second terminal configured to receive a first data packet including the first target data from the first terminal via a local connection; and
a base station in communication with the first terminal and the second terminal via at least one satellite, the base station configured to: (i) receive copies of the first data packet from each of the first terminal and the second terminal via the at least one satellite; (ii) process a first copy of the first data packet received from one of the first terminal and the second terminal; and (iii) delete a second copy of the first data packet received from the other of the first terminal and the second terminal.

14. The system of claim 13, wherein
the first data packet includes the first target data, a unique identifier for the first terminal, a time of creation of the first data packet at the first terminal, and an expected transmission time from the first terminal to the base station via the at least one satellite.

15. The system of claim 13, wherein
the second terminal is configured to create an aggregated data packet including the first data packet and a second data packet and transmit the aggregated data packet to the base station via the at least one satellite.

16. The system of claim 13, wherein
the second terminal is configured to collect second target data,
the first terminal is configured to receive a second data packet including the second target data from the second terminal via the local connection, and
the base station is configured to: (i) receive copies of the second data packet from each of the first terminal and the second terminal via the at least one satellite; (ii) process a first copy of the second data packet received from one of the first terminal and the second terminal; and (iii) delete a second copy of the second data packet received from the other of the first terminal and the second terminal.

17. The system of claim 13, wherein
the first data packet includes an expected transmission time that the first terminal intends to transmit the first data packet to the base station via the at least one satellite, and
the second terminal is configured to delete the first data packet when a next transmission opportunity for the second terminal to transmit data via the at least one satellite is later than the expected transmission time.

18. The system of claim 13, wherein
the first terminal stores transmission data regarding at least one expected transmission opportunity in which the second terminal obtains a direct line of sight to the at least one satellite.

19. The system of claim 18, wherein
the first terminal uses the transmission data to determine whether to transmit the first data packet to the second terminal via the local connection.

20. The system of claim 13, wherein
the base station deletes the second copy of the first data packet when the first copy and the second copy have a same unique identifier and a same time of creation.

* * * * *